Inventor
Albert E. Baak

Sept. 19, 1939.　　　　　A. E. BAAK　　　　　2,173,798
AUTOMATIC RESET MECHANISM
Filed Nov. 23, 1936　　　　4 Sheets-Sheet 2

Inventor
Albert E. Baak
By
George H. Fisher
Attorney

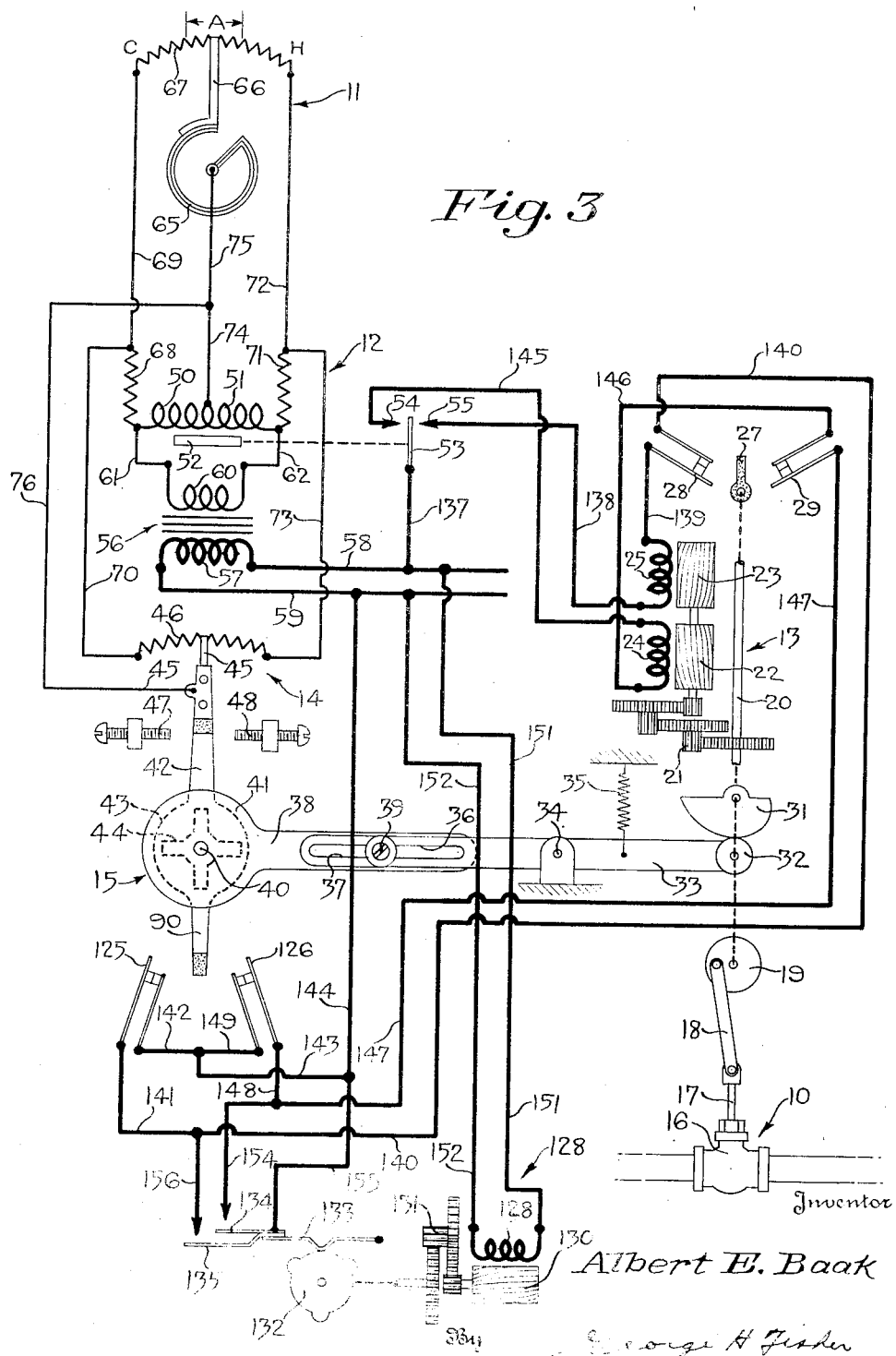

Sept. 19, 1939.     A. E. BAAK     2,173,798
AUTOMATIC RESET MECHANISM
Filed Nov. 23, 1936     4 Sheets-Sheet 4

Inventor
Albert E. Baak
By George H. Fisher
Attorney

Patented Sept. 19, 1939

2,173,798

UNITED STATES PATENT OFFICE 2,173,798

AUTOMATIC RESET MECHANISM

Albert E. Baak, Minneapolis, Minn., assignor to Minneapolis-Honeywell Regulator Company, Minneapolis, Minn., a corporation of Delaware Application November 23, 1936, Serial No. 112,333

12 Claims. (Cl. 236—74)

This invention relates to automatic reset or load compensation mechanisms generally, and more particularly to that type of mechanism as applied to a follow-up control system of the electrical type.

An object of this invention is to provide a control system including a device to be positioned in a plurality of positions to control the value of a condition, control means, the state of which is varied in accordance with changes in the value of the condition to be controlled and follow-up means for positioning the device to maintain the condition to be controlled within certain limits along with a novel reset mechanism associated with the follow-up means of the control system for altering the action of the follow-up means to cause the device to be positioned differently with respect to the state of the control means.

A further object of this invention is to provide a friction connection between the follow-up means of the control system and the device along with stops for limiting movement of the follow-up means to cause the device to be positioned for returning the value of the condition to be controlled toward the desired normal value.

Still another object of this invention is to provide a reset mechanism associated with the follow-up means of a control system wherein the reset mechanism comprises a friction connection between the follow-up means and the device, an intermittently operated means for additionally operating the follow-up means to cause the device to be positioned for returning the value of the condition to be controlled toward the desired normal value.

Other objects and advantages will become apparent to those skilled in the art upon reference to the accompanying specification, claims and drawings.

For a more thorough understanding of this invention reference is made to the accompanying drawings, in which:

Figure 3 is a diagrammatic illustration of still another form of this invention.

Figure 1:
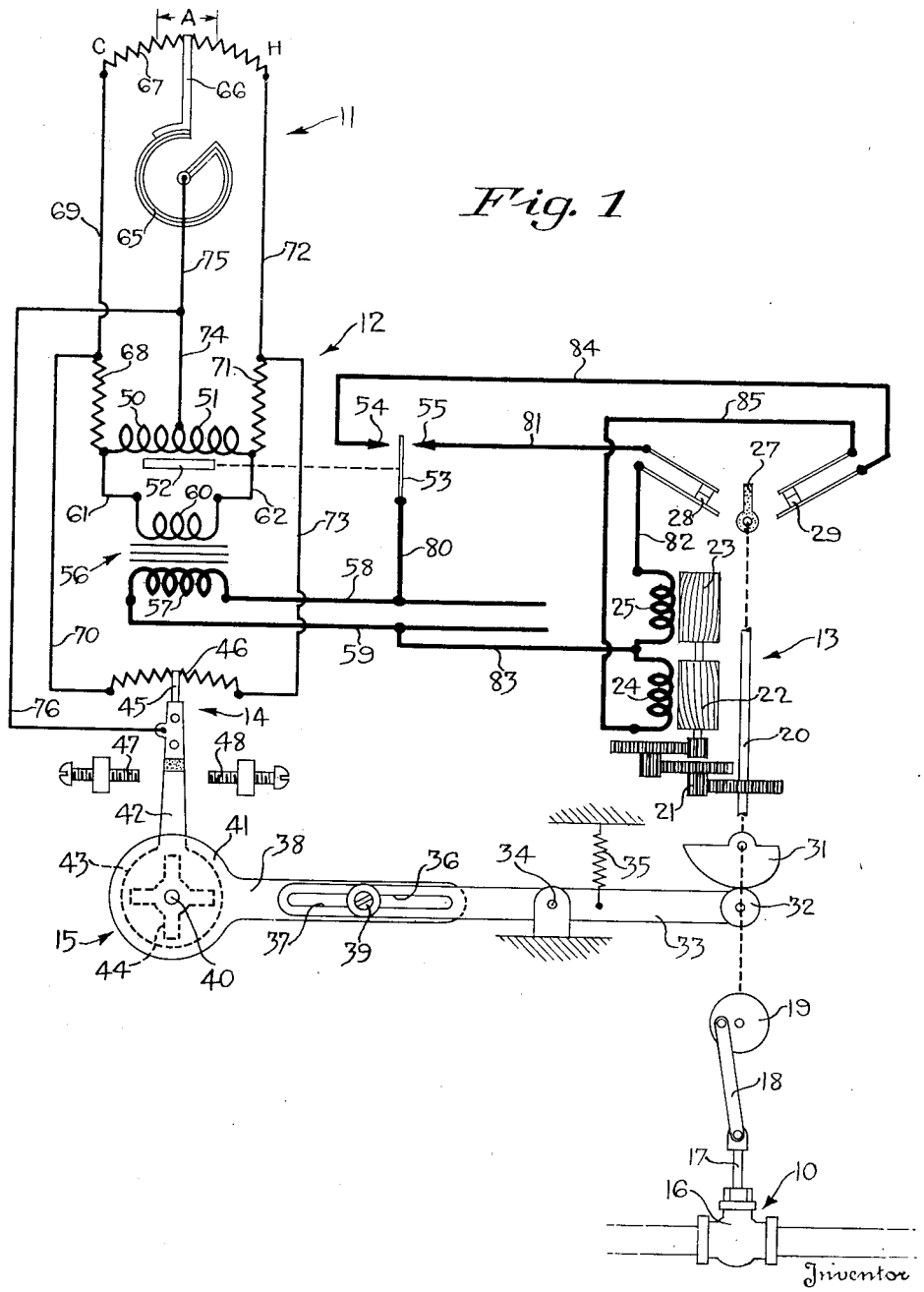
Figure 1 is a diagrammatic illustration of one form of this invention.

Referring now to Figure 1, the device to be positioned in a plurality of positions for controlling the value of a condition is generally designated at 10. The control means responsive to changes in the value of the condition and which has a normal state corresponding to a normal desired value of the condition is generally designated at 11. The control means 11 operates a normally balanced relay generally designated at 12. The relay 12, in turn, controls the operation of a motor generally designated at 13 which positions the device 10. The motor 13 also operates a follow-up mechanism generally designated at 14, and this follow-up mechanism performs a balancing function for the normally balanced relay 12. An automatic reset or load compensation mechanism is generally designated at 15, and this mechanism is adapted to alter the operation of the follow-up means 14.

Although the control system of this invention may control any desired condition, it is shown for purposes of illustration as controlling a temperature condition, and more particularly the temperature of a space, not shown. Therefore, the device 10 to be positioned is shown to comprise a valve 16 for controlling the supply of heating fluid being delivered to the space. The valve 16 is operated by a valve stem 17 which is connected by a pitman 18 to a crank disc 19 mounted on a shaft 20 of the motor 13. The shaft 20 is operated through a reduction gear train 21, by motor rotors 22 and 23. The motor rotors 22 and 23 are operated by field windings 24 and 25. The arrangement is such that when the field winding 25 is energized the valve 16 is moved toward an open position and when the field winding 24 is energized the valve 16 is moved toward a closed position.

The shaft 20 also operates an abutment member 27, preferably made of insulating material, to open limit switches 28 and 29 when the valve 16 is moved to either an extreme opened position or an extreme closed position. The shaft 20 also operates a cam 31, which is engaged by a cam follower 32 mounted on a lever 33. The lever 33 is pivoted on a stationary pivot 34, and the follower 32 is urged into engagement with the cam 31 by a tension spring 35. The opposite end of the lever 33 is provided with an elongated slot 36, which overlies a similar elongated slot 37 in a lever 38. A pivot pin 39 is inserted through the slots 36 and 37 and the lever 38 is pivoted upon a stationary pivot 40. By moving the adjustable pivot pin 39 longitudinally in the slots 36 and 37 the amount of rotation of the lever 38 about its stationary pivot 40 may be adjusted for a given movement of the lever 33 about its stationary pivot 34. The lever 38 is provided with an enlarged portion 41 and a lever 42 also pivoted on the stationary pivot 40 is provided with an enlarged portion 43. Located between the enlarged portions 41 and 42 is a spring friction member 44. The friction member 44 forms a frictional connection between the levers 38 and 42 so that movement of the lever 38 causes like movement of the lever 42. However, excess movement of the lever 38 is permitted by this frictional connection. The lever 42 carries a slider 45, which is adapted to slide across a balancing potentiometer resistance element 46. The slider 45 and the resistance element 46 form the follow-up mechanism 14 for the balanced relay 12. Suitable adjustable stops 47 and 48 limit the amount of movement of the lever 42 and consequently the amount of movement of the slider 45 with respect to the potentiometer resistance element 46.

The balanced relay generally designated at 12 may comprise relay coils 50 and 51 for influencing an armature 52. The armature 52 is suitably connected to a switch arm 53 which is adapted to engage stationary contacts 54 and 55. When the relay coil 51 is energized more than the relay coil 50 the switch arm 53 is moved into engagement with the contact 55, and when the relay coil 50 is energized more than the relay coil 51 the switch arm 53 is moved into engagement with the contact 54. When the relay coils 50 and 51 are equally energized the switch arm 53 is maintained spaced midway between the contacts 54 and 55. Power is supplied to the relay 12 by means of a step-down transformer generally designated at 56. The primary 57 of the transformer 56 is connected across line wires 58 and 59. One end of the secondary 60 of the step-down transformer 56 is connected by a wire 61 to the left end of the relay coil 50, and the other end of the secondary 60 is connected to the right end of the relay coil 51 by a wire 62. The adjacent ends of the relay coils 50 and 51 are connected together. By reason of these wiring connections it is seen that the relay coils 50 and 51 are connected in series and across the secondary 60 of the step-down transformer 56.

The control means 11 responsive to changes in the value of the condition is shown to be a thermostatic control means responsive to changes in the temperature of the space, not shown. The control means 11, therefore, comprises a thermostatic element 65 responsive to changes in space temperature for operating a slider 66 with respect to a control potentiometer resistance element 67. Upon a decrease in space temperature the slider 66 is moved toward the left in the direction indicated by the character C, and upon an increase in space temperature the slider 66 is moved to the right in the direction indicated by the character H. When the space temperature is at the desired normal value the slider 66 is spaced midway of the ends of the control potentiometer resistance element 67, as shown in the drawings.

The left end of the relay coil 50 is connected by a protective resistance 68 and wires 69 and 70 to the left ends of the resistance elements 67 and 46. In a like manner the right end of the relay coil 51 is connected by a protective resistance 71 and wires 72 and 73 to the right ends of the resistance elements 67 and 46. The junction of the relay coils 50 and 51 are connected by wires 74, 75 and 76 to the sliders 66 and 45 of the control and balancing potentiometers respectively. By reason of these wiring connections the control potentiometer 11, the balancing potentiometer 14 and the series connected relay coils 50 and 51 are all connected in parallel and across the secondary 60 of the step-down transformer 56.

As shown in Figure 1 the space temperature is at the desired normal value and, therefore, the slider 66 of the control potentiometer is in a mid position, the switch arm 53 is spaced midway between the contacts 54 and 55, the slider 45 of the balancing potentiometer is in a mid position and the valve 16 is also in a mid position. Under these conditions, it is assumed that the correct amount of heat is being supplied to the space to just make up for the heat losses from the space. Upon a decrease in space temperature the slider 66 is moved to the left in the direction indicated by the character C. By reason of the parallel relationship pointed out above, this left hand movement of the slider 66 causes partial short-circuiting of the relay coil 50 to decrease the energization thereof and to increase the energization of relay coil 51. This causes movement of the switch arm 53 into engagement with the contact 55 to complete a circuit from the line wire 58 through wire 80, switch arm 53, contact 55, wire 81, limit switch 28, wire 82, field winding 25 and wire 83, back to the other line wire 59. Completion of this circuit energizes the field winding 25 to cause movement of the valve 16 towards an open position to increase the supply of heat to the space. Movement of the valve 16 toward an open position causes counter-clockwise movement of the lever 33 and clockwise movement of the levers 38 and 42 to move the slider 45 to the right with respect to the balancing potentiometer resistance element 46. Also, by reason of the parallel relationship pointed out above, right-hand movement of the slider 45 causes partial short-circuiting of the relay coil 51 to decrease the energization thereof and to increase the energization of the relay coil 50. When the slider 45 has moved sufficient far to the right to rebalance the energization of the relay coils 50 and 51, the switch arm 53 is moved out of engagement with the contact 55 to deenergize the field winding 25. This prevents further opening movement of the valve 16, and the valve 16 is held in its newly adjusted position.

Upon an increase in space temperature the slider 66 of the control potentiometer is moved to the right in the direction indicated by the character H. This causes partial short-circuiting of the relay coil 51 to decrease the energization thereof and to increase the energization of the relay coil 50. As a result of these unequal energizations of the relay coils 50 and 51 the switch arm 53 is moved into engagement with the contact 54 to complete a circuit from the line wire 58 through wire 80, switch arm 53, contact 54, wire 84, limit switch 29, wire 85, field winding 24 and wire 83 back to the other line wire 59. Completion of this circuit causes energization of the field winding 24 to move the valve 16 toward a closed position to decrease the supply of heat to the space. Movement of the valve 16 toward a closed position causes movement of the slider 45 to the left with respect to the balancing potentiometer resistance element 46. This causes partial short-circuiting of the relay coil 50 to decrease the energization thereof and to increase the energization of the relay coil 51. When the slider 45 has moved sufficiently far toward the left to rebalance the energizations of the relay coils 50 and 51 the switch arm 53 is moved out of engagement with the contact 54 to prevent further closing movement of the valve 16 and to hold the valve 16 in its newly adjusted position.

By reason of the above follow-up control arrangement valve 16 is positioned in accordance with the amount of deviation of the space temperature from the desired normal value and operates as a true follow-up control system to maintain the space temperature within certain limits. It is found that a control system of this type has what is generally termed a "drooping" characteristic, that is, when the heating load is relatively great the space temperature is maintained at a lower value than when the heating load is relatively light.

In order to minimize this "drooping" characteristic of the follow-up control system the automatic reset mechanism, comprising the friction connection and the stops 47 and 48, is utilized. The stops 47 and 48 limit the amount of movement of the slider 45 with respect to the balancing potentiometer resistance element 46. Therefore, the balancing potentiometer will only rebalance the relay 12 when the space temperature deviates a certain amount from the desired normal value. In other words, the balancing potentiometer will rebalance the relay only when the control slider 66 is within a given range, this range being illustrated by the character A. As long as the slider 66 of the control potentiometer remains within the range designated A the balancing potentiometer will rebalance the relay and the control system will operate in this range as a conventional follow-up system.

Assume now that the load on the heating system increases a relatively large amount to cause the slider 66 to move to the left in the direction indicated by the character C beyond the range A, valve 16 will be moved towards an open position and the lever 42 will move into engagement with the stop 48. Since the balancing potentiometer 14 cannot rebalance the relay 12 the valve 16 will continue in its opening movement to supply additional heat to the space to make up for the increased heating load. The supply of additional heat to the space by this continued opening of the valve 16 raises the space temperature and, as a result, the slider 66 of the control potentiometer is moved back into the control range A. When the slider 66 moves back into the range A, the relay 12 is rebalanced and further opening movement of the valve 16 is prevented. This further opening movement of the valve 16 causes slipping of the friction connection and when the rebalancing action takes place the valve 16 is reset with respect to the value of the space temperature. In other words, when the slider 66 of the control potentiometer returns back to the range A the valve 16 is in a different position than before the slider 66 left the range A as a result of an increase in the load on the heating system. The valve 16 is reset with respect to the position of the control potentiometer in accordance with the increased load on the heating system.

Upon the occurrence of a relatively large decrease in the heating load the slider 66 is moved to the right in the direction indicated by the character H and is moved out of the control range A. This causes operation of the motor 13 to move the valve 16 toward a closed position and also to move the lever 42 into engagement with the stop 47. Since the balancing potentiometer cannot rebalance the relay when the control slider 66 moves out of the range A the valve 16 will continue in its movement towards a closed position and cause slipping of the friction connection. This additionally decreases the supply of heat to the space and as a result the space temperature decreases to move the slider back into the control range A. When the slider 66 returns to the control range A the relay 12 is rebalanced and further closing movement of the valve 16 is prevented. By reason of this operation the valve 16 is adjusted to a new position with respect to the position of the slider 66 of the control potentiometer 11. In other words, the valve 16 is reset with respect to the value of the space temperature in order to make up for the decrease in heating load.

From the above it is seen that I have provided a follow-up control system provided with a reset mechanism wherein for predetermined deviations in space temperature the control system operates as a true follow-up system and for larger deviations in space temperature caused by changes in the heating load the reset mechanism comes into operation for resetting the valve 16 to compensate for these changes in load. Therefore, the "drooping" characteristic of the follow-up control system is minimized and more accurate control obtained. This system as disclosed in Figure 1 gives fairly satisfactory results, but in order to get more accurate results it is found that it is necessary to have some control over the motor 13 when the control slider 66 of the control potentiometer moves out of the range A. Stated in another way, it is desirable to slow down the speed of operation of the motor 13 during the time which the resetting of the valve 16 is taking place. One manner of accomplishing this control during the resetting period is illustrated in Figure 2.

Figure 2:
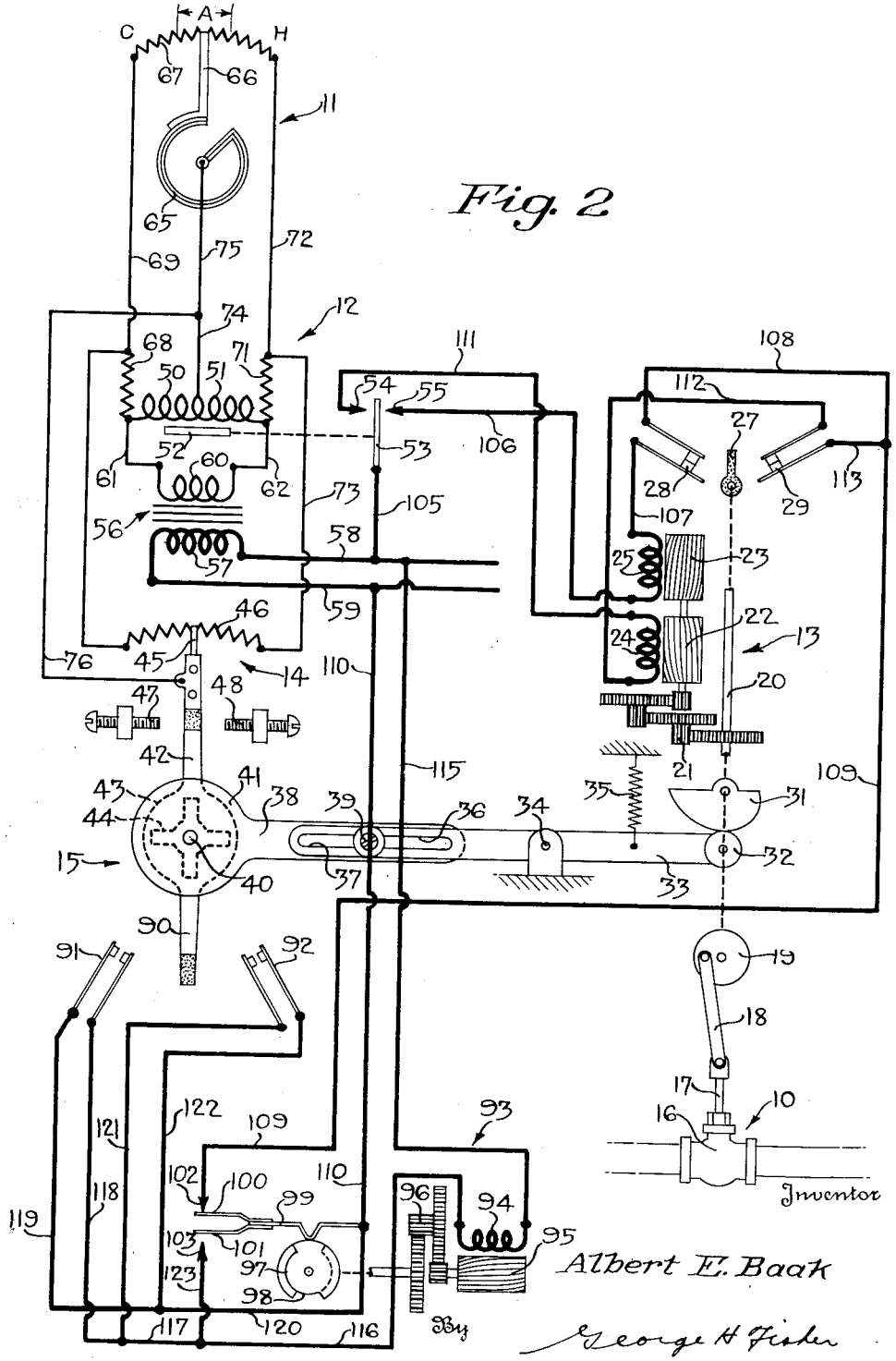
Figure 2 is a diagrammatic illustration of another form of this invention.

Referring now to Figure 2. The valve 10 is operated by the motor 13, the relay 12 controls the motor 13, the control potentiometer 11 and the balancing potentiometer 14 control the relay 12, and the motor 13 operates the balancing potentiometer 14 in exactly the same manner as in Figure 1 and, therefore, like reference characters in the two figures have been utilized. Figure 2 incorporates all of the details that are included in Figure 1. In addition, Figure 2 utilizes an arm 90 carried by the lever 42. The arm 90 is adapted to close normally open switches 91 and 92 when the lever 42 engages stops 48 and 47, respectively. Figure 2 also utilizes a timing device, generally designated at 93, for controlling the operation of the motor 13 to slow down the rate of reset. The timing device 93 may comprise a field winding 94 for controlling the operation of a motor rotor 95. The rotor 95 operates an adjustable cam 97 through a reduction gear train 96. Cam 97 has low dwell 98 and a high dwell which operate a pivoted switch arm 99 carrying contacts 100 and 101. When the high dwell of the cam 97 engages the switch arm 99 the contact 100 is held in engagement with a stationary contact 102, and when the switch arm 99 engages the low dwell 98 of the cam 97 the contact 101 engages a stationary contact 103. The contacts 100, 101, 102, 103 are overlapping contacts. By this it is meant that when the switch arm 99 moves off the high dwell of the cam 97 to the low dwell 98 the contact 101 engages the contact 103 before the contact 100 disengages the contact 102 and when the switch arm 99 moves from the low dwell 98 of the cam 97 to the high dwell the contact 100 engages the contact 102 before the contact 101 disengages the contact 103. The contact 100 is normally held in engagement with the contact 102.

Assume the parts in the position shown in Figure 2. A decrease in space temperature, which moves the slider 66 to the left, in the direction indicated by the character C, causes the switch arm 53 of the relay 12 to engage the contact 55, this completes a circuit from the line wire 58, through wire 105, switch arm 53, contact 55, wire 106, field winding 25, wire 107, limit switch 28, wire 108, wire 109, contacts 102 and 100, switch arm 99 and wire 110 back to the line wire 59. Completion of this circuit causes energization of the field winding 25 to move the valve 16 towards the open position to increase the supply of heat to the space. This also causes operation of the balancing potentiometer to rebalance the relay 12, providing the movement of the slider 66 remains within the range A. Upon an increase in space temperature the slider 66 is moved to the right, in the direction indicated by the character H, relay coil 51 is partially short circuited and the switch arm 53 is moved into engagement with the contact 54. This completes a circuit from the line wire 58, through wire 105, switch arm 53, contact 54, wire 111, field winding 24, wire 112, limit switch 29, wires 113 and 109, contacts 102 and 100, switch arm 99 and wire 110, back to the line wire 59. Completion of this circuit energizes the field winding 24 to move the valve 16 towards the closed position to decrease the supply of heat to the space. This also causes left-hand movement of the slider 45 of the balancing potentiometer to rebalance the relay 12, providing the slider 66 is not moved out of the control range A. From the above it is seen that when the space temperature deviates from the desired normal value, but only deviates enough to maintain the slider 66 within the control range A, the valve 16 is modulated in direct accordance with the amount of deviation in substantially the same manner as the valve 16 of Figure 1 is modulated.

Assume now that an increase in heating load causes the slider 66 to move to the left out of the control range A. This causes movement of the valve 16 towards an open position and also causes movement of the lever 42 into engagement with the stop 48. Movement of the lever 42 into engagement with the stop 48 causes arm 90 to close the switch 91. Closure of the switch 91 completes a circuit from the line wire 58, through wire 115, field winding 94, wires 116, 117, and 118, switch 91 and wires 119, 120 and 110, back to the other line wire 59. Completion of this circuit causes energization of the field winding 94 to place the timing device 93 into operation. The cam 97 is rotated, and when the switch arm 99 is engaged by the low dwell 98 of the cam 97 the contact 100 is moved out of engagement with the contact 102 to break the circuit through the field winding 25, whereupon further opening movement of the valve 16 is prevented. As long as the switch 91 is closed the timing device 93 will continue to operate, and when the high dwell of the cam 97 engages the switch arm 99 the contact 100 engages the contact 102 to again establish the circuit through the field winding 25 to again move the valve 16 towards an open position. In this manner the valve 16 is moved directly towards an open position as the slider 66 moves to the left through the control range A, and when the slider 66 moves to the left beyond the control range A the motor 13 is intermittently operated by the timing device 93 to intermittently move the valve 16 further towards an open position. The rate of resetting of the valve 16 is, therefore, slowed down by this intermittent action.

Assuming, again, the parts in the position shown in Figure 2, a decrease in load causes an increase in the space temperature to move the slider 66 to the right, in the direction indicated by the character H, and this causes partial short-circuiting of the relay coil 51 to move the switch arm 53 into engagement with the contact 54 to complete a circuit through the field winding 24 which moves the valve 16 towards the closed position. If the slider 66 moves beyond the control range A the lever 42 is moved into engagement with the stop 47 and the arm 90 closes the switch 92. Since the balancing potentiometer cannot rebalance the relay 12, the switch arm 53 is maintained in engagement with the contact 54 to maintain the field winding 24 energized. Closure of the switch 92 completes a circuit from the line wire 58, through wire 115, field winding 94, wires 116, 117 and 121, switch 92 and wires 122, 120 and 110, back to the line wire 59. Completion of this circuit causes operation of the timing device 93 and rotation of the cam 97. When the switch arm 99 is engaged by the low dwell 98 of the cam 97 the contact 100 is moved out of engagement with the contact 102 to break the circuit through the field winding 24 of the motor 13. This interrupts the movement of the valve 16 towards the closed position. When the switch arm 99 is subsequently engaged by the high dwell of the cam 97 the contact 100 is moved into engagement with the contact 102 to reestablish the circuit through the field winding 24 to again operate the valve towards its closed position. In this manner the valve 16 is moved towards the closed position as the slider 66 is moved towards the right, in the direction indicated by the character H. The valve 16 is moved directly towards the closed position as the slider 66 moves to the right through the range A, and when the slider 66 moves beyond the range A the valve 16 is intermittently moved towards a closed position by the timing device 93, whereby the rate of resetting of the valve 16 is slowed down.

In order to insure that the timing device 93 will stop in such a position so that the contact 100 engages contact 102, which is necessary for the satisfactory operation of this system, a maintaining circuit for the field winding 94 of the timing device 93 is controlled by the contacts 101 and 103. This maintaining circuit may be traced from line wire 58 through wire 115, field winding 94, wires 116 and 123, contacts 103 and 101, switch arm 99, and wire 110, back to the line wire 59. Therefore, whenever the switch arm 99 is engaged by the low well 98 of the cam 97 the field winding 94 is energized to insure that the timing device 93 will stop only when the switch arm 99 is engaged by the high dwell of the cam 97.

The rate of reset of the mechanism shown in Figure 2 may be adjusted in any number of ways. The speed of rotation of the timing device 93 may be varied by changing the speed of the rotor 95 or by substituting a gear train of different ratio for the gear train 96. Also the cam 97 may be adjusted in the manner shown in the drawings by varying the length of the high and low dwells of this cam. Specifically, lengthening of the low dwell increases the time of interruption of operation of the motor 13 and, therefore, slows down the rate of reset. This may be accomplished by adjusting, with respect to each other, the component parts forming the cam 97.

Referring now to Figure 3, there is disclosed another manner of accomplishing a resetting action in the follow-up system wherein the rate of reset is controlled. All of the structure of Figure 1 is included in Figure 3. The same valve 16, control potentiometer 11, balanced relay 12, motor 13, balancing potentiometer 14, and reset mechanism 15, are utilized. Also in Figure 3, as in Figure 2, the lever 42, which engages the stops 47 and 48, carries an arm 90, but this arm 90 is adapted to open normally closed switches 125 and 126 when the lever 42 engages stops 48 and 47 respectively.

The modification of Figure 3 includes a continuously acting timing device, generally designated at 128, and this device may comprise a field winding 128 connected by wires 151 and 152 across the line wires 58 and 59. The field winding 128 is, therefore, continuously energized and operates a rotor 130, which, in turn, operates a cam 132 through a reduction gear train 131. The cam 132 may have a plurality of high dwells for operating the pivoted switch arm 133. The switch arm 133 operates contacts 134 and 135 and moves these cotnacts into engagement with stationary contacts when the high dwells of the cam 132 operate the switch arm 133.

With the parts in the position shown in Figure 3, a decrease in space temperature causes left-hand movement of the slider 66 to partially short-circuit the relay coil 50. This moves the switch arm 53 into engagement with the contact 55 to complete a circuit from the line wire 58 through wire 137, switch arm 53, contact 55, wire 138, field winding 25, wire 139, limit switch 28, wires 140 and 141, switch 125 and wires 142, 143 and 144 back to the other line wire 59. Completion of this circuit causes energization of the field winding 25 to move the valve 16 towards the open position, and also to move the slider 45 of the balancing potentiometer to the right for rebalancing the relay 12, providing the slider 66 does not move out of the control range A.

Upon an increase in space temperature the slider 66 of the control potentiometer moves to the right to partially short-circuit the relay coil 51. This causes movement of the switch arm 53 into engagement with the contact 54 to complete the circuit from the line wire 58 through wire 137, switch arm 53, contact 54, wire 145, field winding 24, wire 146, limit switch 29, wires 147 and 148, switch 126 and wires 149, 143 and 144, back to the other line wire 59. Completion of this circuit energizes the field winding 24 to operate the valve 16 towards a closed position and to move the slider 45 of the balancing potentiometer to the left. This movement of the slider 45 rebalances the relay 12, providing the slider 66 of the control potentiometer does not move out of the control range A. In this manner the valve 16 is modulated toward the open and toward the closed positions upon a decrease in space temperature or an increase therein, providing the slider 66 remains within the control range A.

Assume that the load on the heating system increases a substantial amount so as to move the slider 66 to the left and beyond the control range A, this causes movement of the valve 16 towards an open position, right-hand movement of the lever 42 into engagement with the contact 48, and opening of the switch 125. Since the switch 125 is in series with the field winding 25 of the motor 13, the operation of the motor 13 will be interrupted. However, wire 156 connected to wires 140 and 141, the contact 135 operated by the timing device and wire 155 connected to wires 143 and 144 provide a shunt circuit for the switch 125. When the timing device moves the contact 135 into engagement with the stationary contact the circuit through the field winding 25 is again reestablished and the valve 16 will be moved further towards an open position, and since the contact 135 is intermittently moved into engagement with the stationary contact the valve 16 will be intermittently moved toward the open position. While the valve 16 is being intermittently moved toward the open position the friction connection is being slipped so that the valve is being intermittently reset with respect to the position of the slider 66 of the control potentiometer. When the slider 66 is subsequently restored to the control range A by this added supply of heat to the space the relay 12 is rebalanced and further opening of the movement of the valve 16 is prevented. The valve 16 is, therefore, repositioned or reset with respect to the value of the temperature being controlled so that the temperature to be controlled is maintained within the given range regardless of changes in load condition.

Assume now that the load condition on the heating system decreases a substantial amount so as to move the slider 66 to the right beyond the control range A, the valve 16 is moved towards a closed position, the lever 42 is moved into engagement with the stop 47 and the switch 126 is opened. Opening of the switch 126 breaks the circuit through the field winding 24 to interrupt the closing of the valve 16. However, a shunt circuit for the switch 126 is provided by a wire 154 connected to wires 147 and 148, the contact 134 operated by the timing device 128, and the wire 155 connected to the wires 143 and 144. When the high dwells of the cam 132 move the contact 134 into engagement with its associated stationary contact the circuit through the field winding 24 is reestablished and the valve 16 is again moved towards the closed position. Since the contact 134 is intermittently moved into engagement with its stationary contact the valve 16 is intermittently moved towards a closed position. While the valve 16 is being so moved toward the closed position the friction connection is being slipped so that the valve 16 is moved to a new position with respect to the position of the slider 66 of the control potentiometer. This new position decreases the supply of heat to the space in accordance with the decrease in load affecting the heating system.

The intermittent operation of the valve 16 may be adjusted by varying the speed of the timing device, by substituting a gear train of different ratio for the gear train 131, or by substituting a different cam for the cam 132. This cam may have more or less high dwells thereon, and the lengths of these high dwells may be of different length in order to accomplish a varying rate of reset.

From the above it is seen that in the modification disclosed by Figure 3, the valve 16 is modulated towards the open and the closed position upon relatively small deviations in space temperature, and is reset with respect to the value of condition upon greater changes in space temperature caused by changes in the load on heating system. Also the rate at which the valve 16 is reset may be adjusted.

Figures 4, 5:
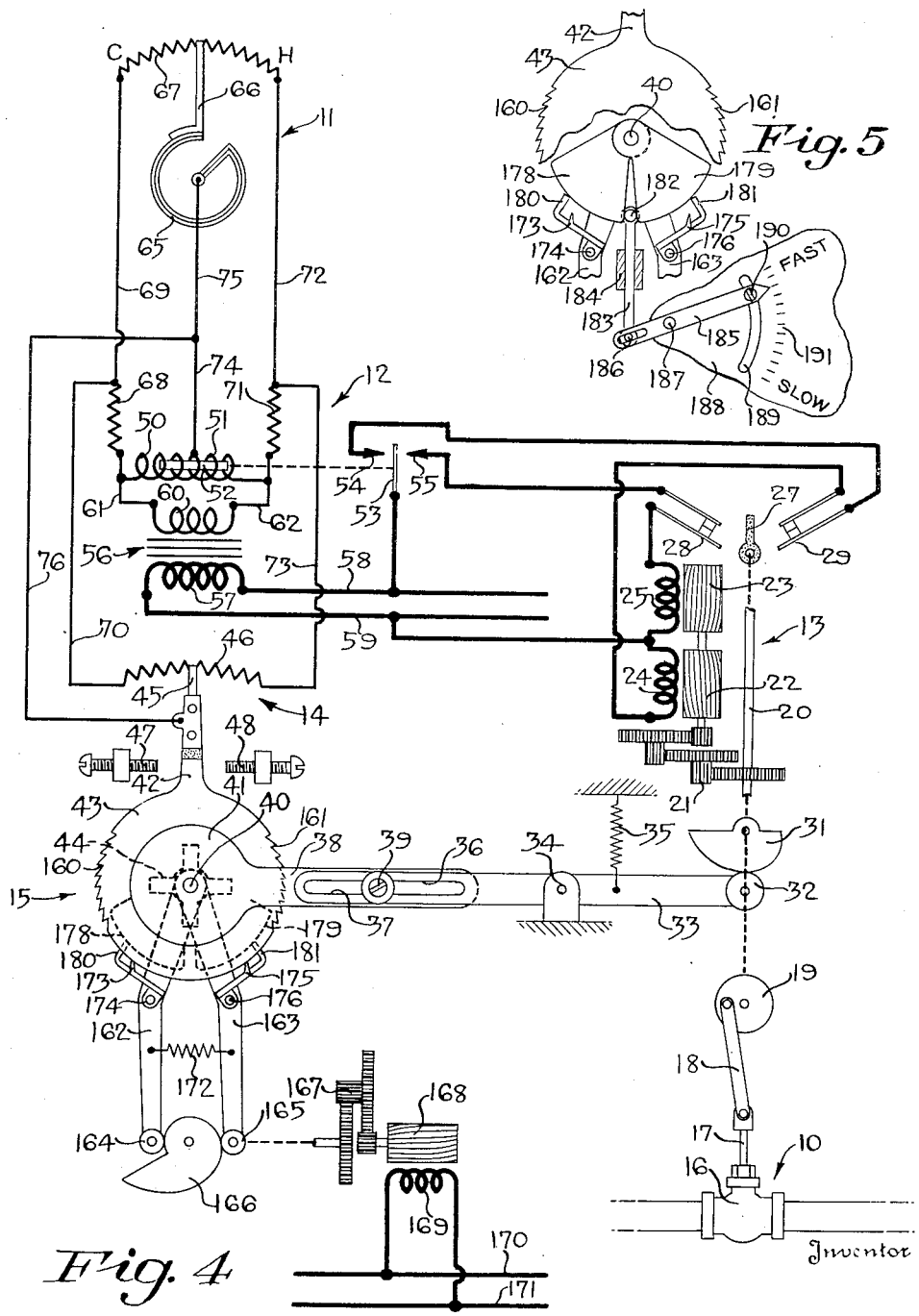
Figure 4 is a diagrammatic illustration of a further form of this invention.
Figure 5 is a diagrammatic view showing in more detail a portion of the construction utilized in Figure 4.

In the above three modifications the valve 16 is reset to restore the temperature value of the space to within the control range A, thereby limiting the amount of "droop" of the system to the extent of the control range A, and in many instances this gives a satisfactory control. In Figures 4 and 5 there is disclosed a manner of reset wherein the valve 16 is reset to return the value of the temperature of the space to a substantially constant value upon changes in load. In other words, the control range A of Figures 1 to 3 is reduced to a minimum by the construction shown in Figure 4, whereby the space temperature is maintained substantially constant regardless of changes in load. In Figure 4 the valve 16 is operated by the motor 13, the motor 13 is controlled by the relay 12, the relay 12 is controlled by the balancing potentiometer 14 and the control potentiometer 11, and the balancing potentiometer 14 is operated by the motor 13 in substantially the same manner as in Figures 1, 2 and 3. Therefore, like reference characters for the various parts have been utilized.

In Figures 4 and 5, however, the enlarged portion 43 of the lever 42 carries on its periphery a plurality of ratchet teeth 160 and 161. Also mounted on the stationary pivot pin 40 are two levers, 162 and 163, which carry at their extremities cam followers 164 and 165 respectively. The cam followers 164 and 165 are held in engagement with the cam 166 by means of a spring 172. The cam 166 is rotated through a reduction gear train 167 by a rotor 168. The rotor 168 is operated by a field winding 169, which is connected across line wires 170 and 171. Therefore, the cam 166 is continuously operated in a counterclockwise direction.

The lever 162 has a pawl pivoted thereto by a pivot 174, and likewise the lever 163 has pivoted thereto a pawl 175 by means of a pivot 176. The pawls 173 and 175 are adapted to engage at certain times the ratchet teeth 160 and 161, respectively, carried by the lever 42. Referring now to Figure 5, also mounted on the stationary pivoted pin 40, are two cams 178 and 179, and the pawls 173 and 175 carry fingers 180 and 181 which are adapted to ride on the surface of the cams 178 and 179. The fingers 180 and 181 may be held in engagement with the cams 178 and 179 by springs, not shown. The cams 178 and 179 are made adjustable by means of a longitudinally operated pin 182, carried by a rod 183, guided in a guide member 184. The other end of the rod 183 carries a pin 186 which engages in a slot at the end of a lever 185, carried by a pivot pin 187 secured to a base 188. The base 188 has a slot therein which receives a screw arrangement 190, carried by the lever 185, and also has indicia 191 cooperating with the lever 185. By moving the lever 185 in a clockwise direction the pin 182 is moved upwardly to separate the cams 178 and 179, and this mechanism is utilized for adjusting the rate of reset in a manner to be more fully pointed out hereafter. The screw arrangement 190 holds the cams 178 and 179 in their adjusted positions.

Assuming the parts in the position shown in Figures 4 and 5, the valve 16 is in a midposition, the space temperature is at the desired normal value, the slider 45 of the balancing potentiometer is in a midposition and just the correct amount of heat to make up for the heat losses is, therefore, being supplied to the space. The cam 166 is continuously rotating to swing the levers 162 and 163 outwardly but the ratchet teeth 160 and 161 are so arranged that when the slider 45 of the balancing potentiometer is in a midposition the ratchet teeth are not engaged or picked up by the pawls 173 and 175.

Assume now that the load on the heating system increases to cause a decrease in space temperature, the slider 66 is thereupon moved to the left to partially short-circuit the relay coil 50, which energizes the field winding 25 to move the valve 16 towards the open position and to move the slider 45 to the right. When the slider 45 is moved to the right upon this call for additional heat the pawl 175, carried by the lever 163, engages the ratchet teeth 161 to move the slider 45 back toward the midposition and slipping the friction connection in so doing. This movement of the slider 45 back toward the midposition partially short-circuits the relay coil 50 to operate the valve 16 further towards an open position, and as long as the space temperature maintains the slider 66 to the left the valve 16 will be inched along towards an open position. By reason of this inching movement of the valve 16 towards an open position, the valve 16 is reset with respect to the position of the slider 66 and additional heat is supplied to the space to make up for the additional heat losses from the space. In other words, the valve 16 is positioned in accordance with changes in the load on the heating system to maintain the space temperature at the desired value. When the space temperature is restored to the desired value the slider 66 assumes the midposition, as shown in Figure 4, and the relay will remain balanced and further opening of the movement of valve 16 is prevented.

Conversely upon a decrease in load on the heating system the slider 66 is moved to the right to partially short-circuit the relay coil 51. This causes energization of the field winding 24 to move the valve 16 towards a closed position and to move the slider 45 towards the left to rebalance the relay 12. The valve 16 is, therefore, moved towards the closed position in the amount that the space temperature increases above the desired normal value. The lever 162 is swung outwardly by the cam 166, and the pawl 173 carried thereby engages the ratchet teeth 160 to move the slider 45 back toward the mild position and slipping the friction connection in so doing. This movement of the slider 45 toward the mid position causes partial short-circuiting of the relay coil 51 to again energize the field winding 24 to move the valve 16 towards a closed position. The movement of the valve 16 towards a closed position again causes left-hand movement of the slider 45, and the ratchet teeth 160 are again engaged by the pawl 173 carried by the lever 162. This moves the slider 45 of the balancing potentiometer again toward the mid position and causes further closing movement of the valve 16. Due to this additional closing of the valve 16 the space temperature is decreased to the desired normal value and the valve 16 is reset with respect to the value of the space temperature to make up for the decrease in heating load.

By reason of the construction shown in Figure 4, upon a deviation in space temperature the valve 16 is moved in accordance with this amount of deviation and is additionally moved in the same direction to make up for changes in the heating load causing the deviation. This additional movement of the valve 16 restores the space temperature to the desired normal value, whereby the space temperature is maintained at a substantially constant value regardless of the changes in the heating load. The "droop" of the system is substantially entirely eliminated.

Referring now to Figure 5, the cams 178 and 179 are so adjusted that the pawls 173 and 175 carried by the levers 162 and 163 may pick up a plurality of ratchet teeth 160 and 161 to rapidly reset the valve 16, and such position is indicated by the indicia 191. By moving the lever 185 in a clockwise direction the cams 178 and 179 are moved upwardly to decrease the number of teeth, 160 and 161, that can be picked up by the pawls 163 and 165 respectively. Since a fewer number of teeth may be picked up by these pawls with the new adjustment, the rate at which the valve 16 is reset is decreased.

Although for purposes of illustration I have shown several modifications of my invention other forms thereof may become apparent to those skilled in the art upon reviewing this specification and, therefore, this invention is to be limited only by the scope of the appended claims and prior art.

I claim as my invention:

1. In combination, a device to be positioned in a plurality of positions to control the value of a condition, control means the state of which is varied in accordance with changes in the value of the condition to be controlled and having a desired normal state corresponding to a desired normal value of the condition, means, including follow-up means operated by the device, controlled by said control means to position said device in accordance with changes in the state of the control means whereby the value of the condition to be controlled is maintained within certain limits, a friction connection between the follow-up means and the device, stops for limiting movement of the follow-up means, and means for controlling the operation of the device when the stops are limiting movement of the follow-up means to cause said device to be positioned for returning the value of the condition toward the desired normal value.

2. In combination, a device to be positioned in a plurality of positions to control the value of a codition, control means the state of which is varied in accordance with changes in the value of the condition to be controlled and having a desired normal state corresponding to a desired normal value of the condition, means, including follow-up means operated by the device, controlled by said control means to position said device in accordance with changes in the state of the control means whereby the value of the condition to be controlled is maintained within certain limits, a friction connection between the follow-up means and the device, stops for limiting movement of the follow-up means, and means for controlling the operation of the device when the stops are limiting movement of the follow-up means to cause said device to be positioned for returning the value of the condition toward the desired normal value, said last mentioned means including time operated means.

3. In combination, a device to be positioned in a plurality of positions to control the value of a condition, control means the state of which is varied in accordance with changes in the value of the conditon to be controlled and having a desired normal state corresponding to a desired normal value of the condition, means, including follow-up means operated by the device, controlled by said control means to position said device in accordance with changes in the state of the control means whereby the value of the condition to be controlled is maintained within certain limits, a friction connection between the follow-up means and the device whereby the follow-up means is operated by the device, and other means for operating the follow-up means for positioning the device, such operation being permitted by the friction connection.

4. In combination, a device to be positioned in a plurality of positions to control the value of a condition, control means the state of which is varied in accordance with changes in the value of the condition to be controlled and having a desired normal state corresponding to a desired normal value of the condition, means, including follow-up means operated by the device, controlled by said control means to position said device in accordance with changes in the state of the control means whereby the value of the condition to be controlled is maintained within certain limits, a friction connection between the follow-up means and the device whereby the follow-up means is operated by the device, and time operated means for also operating the follow-up means to position said device with respect to the state of the control means for returning the value of the condition to be controlled toward the desired normal value.

5. In combination, a device to be positioned in a plurality of positions to control the value of a condition, control means the state of which is varied in accordance with changes in the value of the condition to be controlled and having a desired normal state corresponding to a desired normal value of the condition, means, including follow-up means operated by the device, controlled by said control means to position said device in accordance with changes in the state of the control means whereby the value of the condition to be controlled is maintained within certain limits, a friction connection between the follow-up means and the device whereby the follow-up means is operated by the device, ratchet teeth associated with the follow-up means, time operated means, and pawl means operated by the time operated means for engaging the ratchet teeth whereby the follow-up means is additionally operated to cause said device to be positioned for returning the value of the condition to be controlled toward the desired normal value.

6. In combination, a device to be positioned in a plurality of positions to control the value of a condition, electrical impedance means varied in accordance with changes in the value of the condition to be controlled and having a desired impedance value corresponding to a desired normal value of the condition, electrical relay means in control of the device and operated by variations in the impedance value of the electrical impedance means, follow-up means for said relay means operated by said device for positioning said device in accordance with changes in the impedance value of the impedance means, a friction connection between the follow-up means and the device, stops for limiting movement of the follow-up means, and means for also controlling operation of the device to cause said device to be positioned for returning the value of the condition to be controlled toward the desired normal value.

7. In combination, a device to be positioned in a plurality of positions to control the value of a condition, electrical impedance means varied in accordance with changes in the value of the condition to be controlled and having a desired impedance value corresponding to a desired normal value of the condition, electrical relay means in control of the device and operated by variations in the impedance value of the electrical impedance means, follow-up means for said relay means operated by said device for positioning said device in accordance with changes in the impedance value of the impedance means, a friction connection between the follow-up means and the device, stops for limiting movement of the follow-up means, and means for also controlling operation of the device to cause said device to be positioned for returning the value of the condition to be controlled toward the desired normal value, said last mentioned means including intermittently operated means.

8. In combination, a device to be positioned in a plurality of positions to control the value of a condition, electrical impedance means varied in accordance with changes in the value of the condition to be controlled and having a desired impedance value corresponding to a desired normal value of the condition, electrical relay means in control of the device and operated by variations in the impedance value of the electrical impedance means, follow-up means for said relay means operated by said device for positioning said device in accordance with changes in the impedance value of the impedance means, a friction connection between the follow-up means and the device, ratchet teeth associated with the follow-up means, and intermittently operated pawl means for engaging the ratchet teeth whereby the follow-up means is additionally operated to cause said device to be positioned for returning the value of the condition to be controlled toward the desired normal value.

9. In combination, a device to be positioned in a plurality of positions to control the value of a condition, control variable resistance means, means responsive to changes in the value of the condition to be controlled for adjusting said control variable resistance means, relay means for controlling the operation of said device, balancing variable resistance means operated by said device, connections between said relay means, said control variable resistance means and said balancing variable resistance means for positioning said device in accordance with changes in the value of the condition to be controlled, a friction connection between the balancing variable resistance means and the device, and stops for limiting the movement of the follow-up means to cause said device to be positioned differently with respect to the value of the condition to be controlled.

10. In combination, a device to be positioned in a plurality of positions to control the value of a condition, control variable resistance means, means responsive to changes in the value of the condition to be controlled for adjusting said control variable resistance means, relay means for controlling the operation of said device, balancing variable resistance means operated by said device, connections between said relay means, said control variable resistance means and said balancing variable resistance means for positioning said device in accordance with changes in the value of the condition to be controlled, a friction connection between the follow-up means and the device, ratchet teeth associated with the follow-up means, and intermittently operated pawl means for engaging the ratchet teeth whereby the follow-up means is additionally operated to cause said device to be positioned for returning the value of the condition to be controlled toward the desired normal value.

11. In a reset mechanism for a device to be positioned in a plurality of positions, the combination of a member, a control element movable with respect to the member for performing a control function, a friction connection between the control element and the device whereby the former is operated by the latter, ratchet teeth carried by said control element, and intermittently operated pawls for engaging the ratchet teeth to cause said control element to be moved to a given position with respect to said member.

12. In a reset mechanism for a device to be positioned in a plurality of positions, the combination of a member, a control element movable with respect to the member for performing a control function, a friction connection between the control element and the device whereby the former is operated by the latter, ratchet teeth carried by said control element, and intermittently operated pawls for engaging the ratchet teeth to cause said control element to be moved to a given position with respect to said member, and adjustable means for limiting the number of ratchet teeth engaged by said pawls, whereby the rate at which the control element is moved to the given position with respect to the member may be varied.

ALBERT E. BAAK.